(No Model.)
T. W. APPLEYARD.
BICYCLE LOCK.
No. 578,535. Patented Mar. 9, 1897.
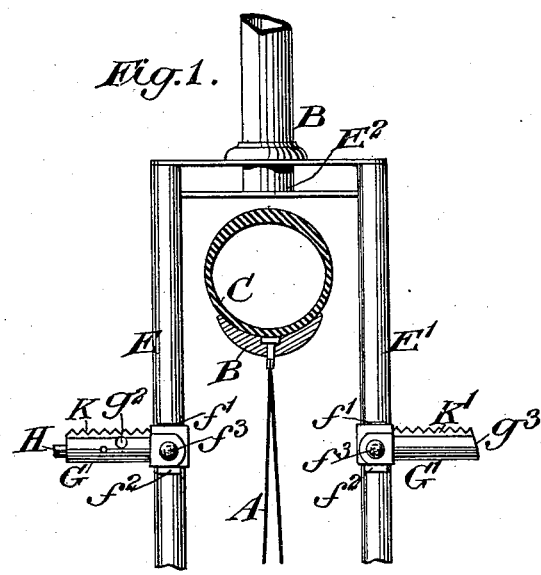
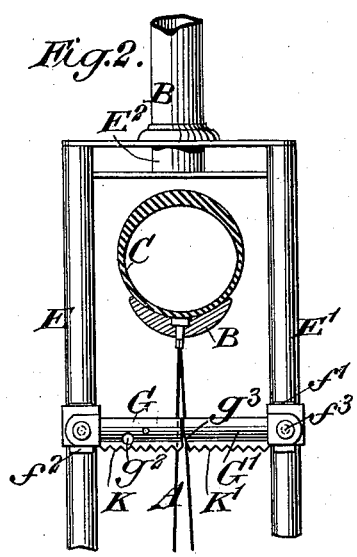
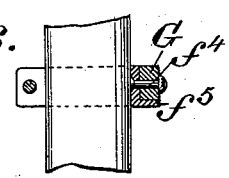
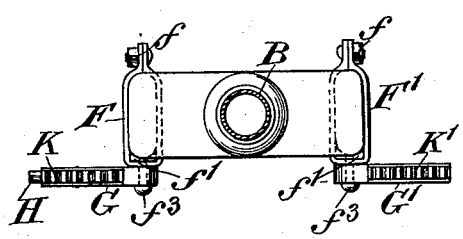
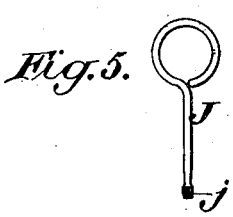
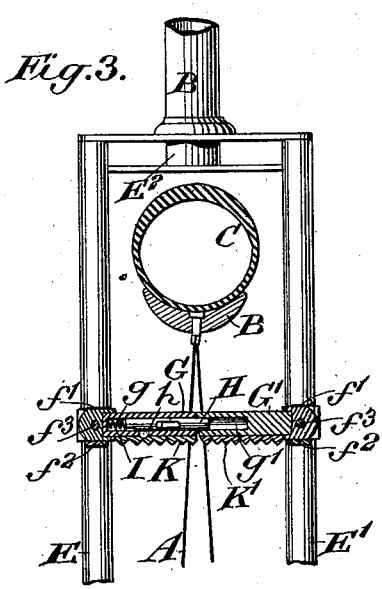
Witnesses:—
George Barry Jr.
Inventor:—
Thomas W. Appleyard
by attorneys
Brown & Seward

UNITED STATES PATENT OFFICE.

THOMAS W. APPLEYARD, OF BROOKLYN, NEW YORK, ASSIGNOR TO LOUIS T. DURYEA, OF GLENCOVE, NEW YORK.

BICYCLE-LOCK.

SPECIFICATION forming part of Letters Patent No. 578,535, dated March 9, 1897.

Application filed April 22, 1896. Serial No. 588,533. (No model.)

*To all whom it may concern:*

Be it known that I, THOMAS W. APPLEYARD, of Brooklyn, in the county of Kings and State of New York, have invented a new and useful Improvement in Bicycle-Locks, of which the following is a specification.

The object of my invention is to provide a bicycle-lock which consists of swinging interlocking members or sections clipped or secured to the front-fork sides of a bicycle of the well-known safety type, the said members when being swung outwardly serving as coasters or foot-rests for the wheelman and when swung inwardly will interlock between the spokes of the front wheel of the bicycle and prevent it from rotating. The lock is so constructed that the parts may be snapped together, and when so joined will be automatically locked and will require the use of a key to release them.

A practical embodiment of my invention is represented in the accompanying drawings, in which—

Figure 1 is a rear view of a portion of the front fork and steering-head and a transverse section through a portion of the front wheel of a bicycle, the lock in this instance being shown with its members swung outwardly to form coasting-rests. Fig. 2 is a similar view with the members of the lock shown interlocked between the spokes of the wheel. Fig. 3 is a view similar to Fig. 2, the members being shown in longitudinal vertical section to illustrate the device for locking them together. Fig. 4 is a top plan view of the parts as shown in Fig. 1. Fig. 5 is a view of a key adapted for use in unlocking the two members, and Fig. 6 is a vertical section through a modified form of clip for supporting one of the swinging members of the lock.

The spokes of the wheel are denoted by A, the rim by B, and the tire by C. The steering-head is denoted by D and the front-fork sides by E E', connected at their upper ends by a suitable fork-crown $E^2$.

Proceeding to describe the lock, suitable clips F F' are secured to the fork sides E E' at points opposite each other. The said clips may be secured to the fork sides by a suitable bolt-and-nut fastening $f$, or, if so desired, the free ends of the clips may be riveted together.

The two interlocking swinging members of the lock are denoted by G G', and they are pivoted, the one to the clip F and the other to the clip F', in the following manner: A block $f'$ is held in position between the rear of the fork side and the clip F, and the said block is provided with a laterally-extended stop $f^2$, projecting a short distance rearwardly from the clip. A pivot-pin $f^3$ extends from the block $f'$ outwardly through the clip and through the swinging member of the lock and is then preferably headed or upset, thereby locking the swinging member against removal from the clip.

The swinging members G G' are provided with elongated sockets extending from their free ends inwardly toward their pivots, and within one of the said sockets, in the present instance the socket $g$ in the swinging member G, I locate the slide-bolt, which locks the two members together when they are swung toward each other. This locking-bolt is denoted by H and has a pin-and-slot connection with the member G, whereby it is allowed a limited sliding movement therein. The sliding bolt H is held normally at the limit of its outwardly-sliding movement, with its end projecting a short distance beyond the end of the swinging member G by means of a spring I, which spring in the present instance is interposed between the inner end of the sliding bolt H and the bottom of the socket $g$.

When the two members G G' are swung inwardly so that their ends meet between the spokes of the wheel, the end of the sliding bolt enters a short distance into the socket $g'$ in the swinging member G', and the two members are thereby locked together and cannot be released without the aid of a key.

The arrangement which I have provided for throwing the bolt backwardly to release the interlocking sections or members is as follows: A keyhole $g^2$ is formed in the swinging member G, and it communicates with the socket $g$ in the said swinging member. Along the lower side of the sliding bolt H, I provide a series of transverse teeth $h$, formed in the present instance by cutting notches in the said bolt. These teeth are so located with respect to the keyhole $g^2$ that when a key is inserted within the said hole it will be caused to engage the said teeth. The key which I have provided for throwing the bolt is denoted by J, and it is provided at its end with a pinion $j$, which is adapted to mesh with the teeth $h$ in the bolt, whereby as the key is turned the bolt will be withdrawn.

Along the sides of the swinging members G G', which are uppermost when the said members are swung outwardly, I provide, preferably, roughened surfaces K K' to prevent the slipping of the foot when the said members are used as coasters.

It will be seen from the drawings that the stops $f^2$ serve as abutments for the swinging members G G', so that they are only free to swing from an outward horizontal position upwardly and over into an inwardly-extended horizontal position. These abutments serve to hold the swinging members in position when they are used as coasting-rests.

The member which does not carry the sliding bolt H may be slightly beveled, as shown at $g^3$, so as to allow it to force the end of the sliding bolt H inwardly as the two members are swung into contact with each other, thereby facilitating the locking of the two members together.

From the above description it will be seen that the swinging members serving both as a lock and as a coasting-rest enables the rider to carry only a key with him, doing away with the necessity of carrying a chain and lock or with the necessity of having an unsightly lock fastened onto the wheel. These members, when swung outwardly, appear to be simply coasting-rests unless closely examined, and the appearance of the wheel is not marred in any respect.

In the form shown in Fig. 6 the swinging member is shown secured by a pivot $f^4$, secured directly to the clip, and the stop for limiting the swinging movement of the clip is shown as formed integral with the clip and is denoted by $f^5$.

It is evident that slight changes might be resorted to in the form and arrangement of the several parts without departing from the spirit and scope of my invention. Hence I do not wish to limit myself strictly to the structure herein set forth; but

What I claim is—

1. The combination bicycle-lock and foot-rest, comprising two movable members secured to the bicycle-frame, the said members being provided with means for interlocking them when they are moved into engagement with each other, the said members forming foot-rests when moved away from each other, substantially as set forth.

2. A combination bicycle-lock and foot-rest, comprising two swinging members, secured to the fork sides of the bicycle-frame, the said members being provided with means for interlocking them when they are swung inwardly and adapted to form foot-rests when they are swung outwardly, substantially as set forth.

3. A bicycle-lock comprising two swinging members secured to the fork sides of a bicycle and a locking device carried by one of the swinging members in position to engage the other swinging member when the two are swung together to interlock the two members, substantially as set forth.

4. A bicycle-lock, comprising swinging members secured to the fork sides of a bicycle, a sliding bolt carried by one of said members adapted to enter a socket in the other member when the two members are swung together, the said bolt being adapted to be engaged by the key to withdraw it for releasing the two members, substantially as set forth.

5. A bicycle-lock, comprising swinging members secured to the fork sides of a bicycle and adapted to interlock when swung inwardly, a sliding bolt in one of the members adapted to enter a socket in the other member when the two members are swung together, means for yieldingly holding the bolt at the limit of its forwardly-sliding movement, the said bolt being provided with a series of teeth adapted to be engaged by a key for sliding it rearwardly to release the two members, substantially as set forth.

THOS. W. APPLEYARD.

Witnesses:
FREDK. HAYNES,
ROBT. B. SEWARD.